United States Patent [19]

Muellenberg

[11] Patent Number: 4,702,637
[45] Date of Patent: Oct. 27, 1987

[54] CONICAL STRESSING DEVICE FOR CONNECTING A HUB TO A SHAFT

[76] Inventor: Ralph Muellenberg, Im Wiesengrund 6, D-4048 Grevenbroich 12, Fed. Rep. of Germany

[21] Appl. No.: 866,588

[22] Filed: May 23, 1986

[30] Foreign Application Priority Data

May 25, 1985 [DE] Fed. Rep. of Germany ....... 3518954

[51] Int. Cl.$^4$ .............................................. F16D 1/06
[52] U.S. Cl. ................................... 403/373; 403/370; 403/13
[58] Field of Search ................ 403/13, 374, 366, 370, 403/367, 373, 374

[56] References Cited

U.S. PATENT DOCUMENTS

| | | | |
|---|---|---|---|
| 3,165,342 | 1/1956 | Anderson | 403/374 |
| 3,596,943 | 8/1971 | Krauss | 403/373 X |
| 3,717,367 | 2/1973 | Peter et al. | 403/366 |
| 3,957,381 | 5/1976 | Schafer | 403/374 |
| 3,958,888 | 5/1976 | Mullenberg | |
| 3,972,635 | 8/1976 | Peter et al. | 403/13 |
| 3,972,636 | 8/1976 | Peter et al. | 403/370 |
| 3,990,804 | 11/1976 | Peter et al. | 403/374 X |
| 3,998,563 | 12/1976 | Klören | 403/374 X |
| 4,025,213 | 5/1977 | Schäfer et al. | 403/374 X |
| 4,376,592 | 3/1983 | Martinek | 403/341 X |
| 4,396,310 | 8/1983 | Müllenberg | 403/373 |
| 4,557,621 | 12/1985 | Mullenberg | 403/370 X |
| 4,573,825 | 3/1986 | Müllenberg | 403/374 X |

FOREIGN PATENT DOCUMENTS 1217074 12/1970 United Kingdom.
2026650 2/1980 United Kingdom ................ 403/374

Primary Examiner—Richard J. Scanlan, Jr.
Assistant Examiner—Joseph A. Fischetti
Attorney, Agent, or Firm—Schwartz, Jeffery, Schwaab, Mack, Blumenthal & Evans

[57] ABSTRACT

A conical stressing device for connecting a hub to a shaft, the device including a double conical stressing assembly adapted to be mounted on the outer periphery of the hub, so that the hub may be radially compressed to attach it rigidly to the shaft by frictional forces, the double conical stressing assembly including: (1) a double conical ring which has two coaxial peripheral surfaces axially spaced apart and tapering in opposite directions, whereby the greatest wall thickness of the double conical ring is in the central region of its axial length, (2) two conical rings, each of which possesses a conical peripheral surface that acts in conjunction with a respective conical surface of the double conical ring, and (3) axial tensioning bolts which are distributed around the perimeter and are inserted in holes drilled axially in the conical rings, the axial tensioning bolts placing the conical rings under axial tension to force them to slide along the conical surfaces, wherein one of the conical rings tensions the double conical stressing assembly around the hub and the other conical ring tensions the double conical stressing assembly axially on the shaft in front of the hub.

8 Claims, 2 Drawing Figures

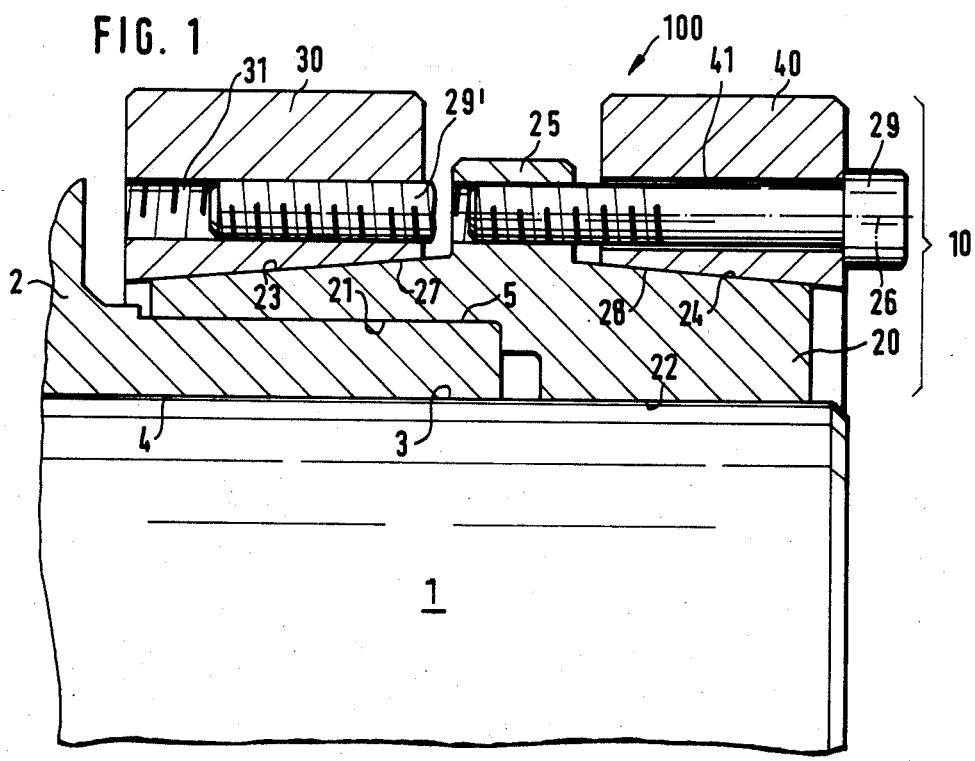
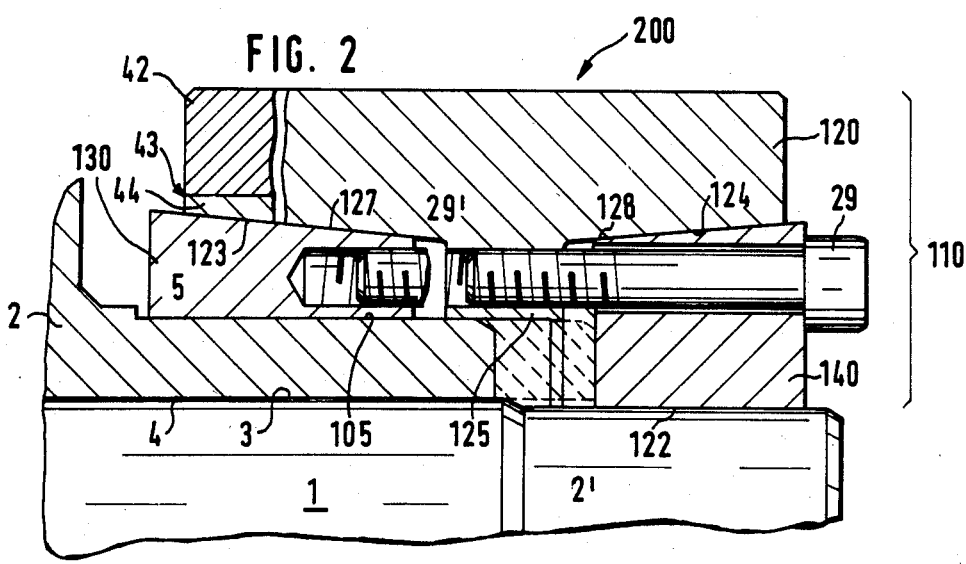

CONICAL STRESSING DEVICE FOR CONNECTING A HUB TO A SHAFT

BACKGROUND OF THE INVENTION

1. Field of the Invention

The invention relates to a conical stressing device for connecting a hub to a shaft.

2. Related Art

Typical conical stressing devices are shown in German Offenlegungsschrift DE-OS No. 23 29 940 and German Patent Specification DE-PS No. 12 94 751. In DE-OS No. 23 29 940 the double conical ring is the outer ring and the individual conical rings are seated on the hub within the double conical ring. In DE-PS No. 12 94 751 the double conical ring is seated on the hub and the individual conical rings are outer rings which, during the tensioning, produce an annular tensile stress.

In both of the preceding cases, however, the double conical stressing assembly is arranged entirely on the hub. The frictional connection between the hub and the shaft, which is the determining factor for the transmission of the torque, is produced exclusively by the forcing together of the hub by the double conical stressing assembly.

Conical stressing devices are frequently employed in heavy-duty drive connections where it is necessary to avoid any possible weakening of the shaft by keyways and the resulting localized increase of stress from notch effects. The diameter of the shaft is most commonly in the region of several hundred millimeters. The hub is appropriately dimensioned so that it is able to transmit the forces taken up from the drive shaft to the driven components which are connected to it. It is necessary that the hub should not be too thick-walled because, if it is, then too much of the clamping force of the double conical stressing assembly is wasted solely on deformation of the hub. Thus, the dimensioning of the hub is critical, and can lead in practice to the output capacity of the ub being overstrained. The shearing forces arising from the transmitted torque are superimposed, in the hub, on the very considerable radial compressive forces due to the pressure exerted by the double conical stressing assembly, so that comparative streses are developed which could actually lie in the region of the yield point, or flow limit, of the material.

OBJECTS AND SUMMARY OF THE INVENTION

The problem which forms the basis of the present invention is to provide a conical stressing device giving a reduction of the stresses arising in the hub.

Accordingly, the present invention provides a conical stressing device for connecting a hub to a shaft, the device including a double conical stressing assembly adapted to be mounted on the outer periphery of the hub, so that the hub may be radially compressed to attach it rigidly to the shaft by frictional forces, the double conical stressing assembly including: (1) a double conical ring which has two coaxial peripheral surfaces axially spaced apart and tapering in opposite directions, whereby the greatest wall thickness of the double conical ring is in the central region of its axial length, (2) two conical rings, each of which possesses a conical peripheral surface that acts in conjunction with a respective conical surface of the double conical ring, and (3) axial tensioning bolts which are distributed around the perimeter and are inserted in holes drilled axially in the conical rings, the axial tensioning bolts placing the conical rings under axial tension to force them to slide along the conical surfaces, wherein one of the conical rings tensions the double conical stressing assembly around the hub and the other conical ring tensions the double conical stressing assembly axially on the shaft in front of the hub.

The stressing is effected on the hub by one conical ring as formerly but, in contrast to the known devices, it is effected directly on the shaft by way of the other conical ring. In the known devices, the double conical stressing assembly has both its conical rings located on the outside of the hub so that they do not participate in the transmission of the torque. Instead, transmission takes place almost exclusively by the frictional forces on the inner periphery of the hub. As opposed to this, in the present invention, the double conical ring which is directly tensioned aginst the shaft at one end does participate in the transmission of the torque and directs the corresponding torque component at the outer periphery of the hub into this hub, that is to say, at a location with greater radius and greater momentum leverage, so that, for achieving the same transmitted total torque, it is possible to decrease the radial clamping force of the conical ring which is acting on the hub by a corresponding amount. In this manner, the comparative stressing, resulting from the trnsmitted torque and the radial clamping forces, which determines the initiation of material flow, is also reduced, that is to say, the stresses necessary to be imposed on the hub to produce the same torque are also reduced.

The invention may be implemented in two alternative embodiments. In the first embodiment, the double conical ring in relation to the two individual conical rings is seated on the inside and has one end directly in contact with the shaft. In the second embodiment, the double conical ring, in relation to one individual conical ring, is the outside ring and one of the individual conical rings is seated directly on the shaft. However, in this case, the torque must additionally be transmitted to the conical surfaces between the individual conical rings and the double conical ring.

BRIEF DESCRIPTION OF THE DRAWINGS

Practical embodiments of the invention will now be described with reference to the non-limitative examples illustrated in the accompanying drawings, wherein:

FIG. 1 depicts a partial longitudinal section through a first embodiment of a conical stressing assembly mde in accordance with the invention; and FIG. 2 is the same view as FIG. 1 but showing a second embodiment of the invention.

DETAILED DESCRIPTION OF THE INVENTION

In the conical stressing assembly 100 shown in FIG. 1, a hub 2 is non-rotatably mounted on a shaft 1. By "shaft" is to be understood any structural component with a cylindrical outer peripheral surface 3, and thus it includes a journal for example, or the external surface of a pipe or similar object. By "hub" is to be understood any tube-shaped structural component with a cylindrical inner peripheral surface 4 and with a cylindrical outer peripheral surface 5, under which conditions the "wall thickness" still allows for a certain amount of radial deformation for the production of frictional engagement with the shaft 1; that is to say, the wall thickness is generally small in comparison witht he overall diameter of the hub. The hub 2 may be provided, for example on a toothed gear wheel or on a drum, or it may also be formed by the end of a hollow shaft or by the bored-out end of an additional shaft.

The rigid positioning of the hub 2 on the shaft 1 is effected by means of a double conical stressing assembly 10 which comprises one double conical ring 20 and two individual conical rings 30, 40. The double conical ring 20 has a stepped cylindrical inner peripheral surface, in which case the region 21 with the greater internal diameter is seated on the outer peripheral surface 5 of the hub 2, whereas the region 22 lying to the right side of FIG. 1 and which has the smaller diameter is seated directly on the outer peripheral surface of the shaft 1.

The outer peripheral surface of the double conical ring 20 comprises two conical surfaces 23, 24 which progressively decrease in diameter in opposite directions along the longitudinal axis and between which there is an annular web 25 projecting radially outwardly from the conical surfaces 23, 24. Conical rings 30, 40 are seated on the double conical ring with their inner conical peripheral surfaces 27, 28 in contact with its outer peripheral conical surfaces 23, 24, where the angle at the base of the cones is the same in all cases.

Axial tensioning bolts are provided very close together on a pitch circle 26 around the periphery, by means of which the conical rings 30, 40 may be tightened onto the conical surfaces 23, 24 of the double conical ring 20, which is compressed radially so that frictional forces establish its fixed position on shaft 1. So that the annular tensile stresses developed in the unslotted conical rings 30, 40, when the tensioning bolts are tightened, can be transformed into radial clamping forces with the least possible loss, the double conical ring 20 may be provided with one longitudinal slot at one position around its periphery.

In FIG. 1 there is provision for one set of tensioning bolts 29 which may be inserted axially into continuous holes 41 passing right through the conical ring 40 from the right hand side as shown in FIG. 1 so that the heads of the bolts come to rest against the right-hand end surface of conical ring 40 and the externally threaded end sections of the bolt engage in the axial internally threaded holes in the annular peripheral web 25. Another set of tensioning bolts 29' passes through continuous holes in the conical ring 40 and also in the annular web 25, again from the right-hand side and the threaded end sections of these bolts engage in the axial internally threaded holes 31 in the conical ring 30. This makes it possible for both the conical rings 30, 40 to be tightened from the right-hand side.

If the base angle of the cone lies in the self-locking region, then pressure-release bolts, which have not been shown, are provided for the purpose of forcing off the conical rings 30, 40 separately along the double conical ring 20 in the axial direction. The tensioning bolt 29' which is indicated in FIG. 1 is expediently offset circumferentially from the bolt 29 at an appropriate distance for their actual separate manipulation.

The conical ring 40 tensions the double conical ring 20 in its cylindrical region 22 directly around the shaft 1. The conical ring 30 tensions the double conical ring 20 between itself and the outer peripheral surface 5 of the hub 2 and in addition it forces the cylindrical inner peripheral surface 4 of the hub 2 against the shaft 1. This gives rise to a frictional locking engagement on the outer peripheral surface 5 of the hub 2, which serves for the further transmission of the torque derived from the double conical ring in the region 22 to the hub 2 and, in addition, to the inner peripheral surface 4 of the hub 2 where the torque may be transmitted by the radial compression of the hub.

In the case of the conical stressing assembly 200 shown in FIG. 2, the function of the fixing into position of the hub 2 is the same as that in FIG. 1. The difference resides only in the manner in which the double conical stressing assembly 110 is configured, in which case, as shown in FIG. 2, the double conical ring 120 is located radially outside the individual conical rings 130, 140 and the conical surfaces 123, 124 belong to the inner peripheral surface. The individual conical rings 130, 140 respectively possess the external conical surfaces 127 and 128 which act in conjunction with the inner peripheral conical surfaces 123, 124 respectively, as well as each having inner cylindrical peripheral surfaces 105, 122 respectively which are seated on the outer peripheral surface 5 of the hub 2 and on the outer peripheral surface 3 of the shaft 1.

The outer portion of the shaft 1 is slightly offset in the embodiment shown in FIG. 2, so that the inner peripheral surface 122 of the conical ring 140 has a slightly smaller diameter than the inner peripheral surface 4 of the hub 2.

The peripheral annular web 125 of the double conical ring 120 is located between the conical rings 130, 140 and projects radially inwardly where it acts in conjunction with the axial tensioning bolts 29, 29' similarly to the peripheral annular web 25 shown in FIG. 1.

The double conical ring 120 is not slotted so that it is able to exert the necessary ring tensioning force. The conical rings 130, 140 may be slotted longitudinally at one position around their periphery so that they may be easily compressed. If the end section of the hub 2, as shown by the broken lines at 2' in FIG. 2, extends to come into contact with the left-hand end face of the conical ring 140, so that this conical ring 140 is prevented from being displaced axially in the direction of the hub 2, and also along the shaft 1 in the same direction, then, when the tensioning bolt 29 is tightened, the conical ring 140 remains stationary on the outer peripheral surface of the shaft 1 but there is sliding on the surface 128, and it is only when the tensioning bolt 29' is tightened that any sliding takes place on the surfaces 105 and 127, making a total of three surfaces, instead of four, thus reducing the frictional losses, and the degree of effectiveness of the tensioning bolts 29, 29' is thereby improved.

The conical rings 30, 40, 120 as depicted in the embodiments serve only for the application of clamping forces. However, these conical rings may also be functional components or else they may be connected to such functional components, for example to gear wheels, to belt pulleys or the like.

It is also possible for the conical rings 30, 40, 120 to be distributed along a concentric cylindrical surface 43 and to consist of an inner ring 41 having conical surfaces and of an outer ring 42 which surrounds said inner ring, as indicated at the upper left-hand side of FIG. 2. The outer ring 42 is fabricated from steel with high tensile strength which can withstand very considerable ring stresses without plastic deformation. This makes it possible to apply greater forces or, when the same forces are applied, it means that the cross-sectional area may be reduced, thus decreasing the external diameters of the conical rings 30, 40, 120.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A double conical stressing device for connecting a hub to a shaft, comprising:
   (a) a double conical ring adapted to be mounted about an outer periphery of a hub, said double conical ring having a pair of peripheral surfaces axially spaced apart and tapered in opposite directions;
   (b) said double conical ring having a wall thickness varying along the tapered surfaces, the greatest wall thickness being between said tapered surfaces;
   (c) a pair of conical rings, each having a conical peripheral surface on a respective conical surface of said double conical ring;
   (d) a plurality of axial bolt means for axially tensioning said rings and placing said conical rings under axial tension for sliding along said conical surfaces;
   (e) one of said conical rings adapted to tension a first portion of the device on the hub and the other conical ring adapted to tension a second portion of the device on a shaft portion adjacent the hub;
   said rings having inner surfaces of different internal diameters whereby one conical ring is adapted to be mounted on the hub and the other conical ring is adapted to be mounted on the shaft portion.

2. The device of claim 1 wherein said double conical ring has inner and outer surfaces and the conical surfaces of said double conical ring are the inner surfaces.

3. The device of claim 2 wherein said conical rings are mounted on said inner surface.

4. A double conical stressing device for connecting a hub to a shaft, comprising:
   (a) a double conical ring adapted to be mounted on an outer periphery of a hub, said double conical ring having a pair of peripheral surfaces axially spaced apart and tapered in opposite directions;
   (b) said double conical ring having a wall thickness varying along the tapered surfaces, the greatest wall thickness being between said tapered surfaces;
   (c) a pair of conical rings, each having a conical peripheral surface on a respective conical surface of said double conical ring;
   (d) a plurality of axial bolt means for axially tensioning said rings and placing said conical rings under axial tension for sliding along said conical surfaces;
   (e) one of said conical rings adapted to tension a first portion of the device on the hub and the other conical ring adapted to tension a second portion of the device on a shaft portion adjacent the hub;
   said double conical ring having inner and outer surfaces and the conical surfaces of said double conical ring being the outer surfaces;
   the inner surface of said double conical ring being stepped cylindrically having larger and smaller internal diameters, the larger diameter being adapted to seat on the hub and the smaller diameter being adapted to seat on the shaft portion.

5. The device of claim 4 wherein said conical rings are mounted on said outer surfaces.

6. A conical stressing device for connecting a hub to a shaft, said device including a double conical stressing assembly adapted to be mounted on the outer periphery of the hub, so that the hub may be radially compressed to attach it rigidly to the shaft by frictional forces, said double conical stressing assembly comprising:
   (a) a double conical ring having two coaxial peripheral surfaces axially spced apart, tapering in opposite directions and having the greatest wall thickness of the double conical ring in the central region of its axial length,
   (b) two conical rings, each having a conical peripheral surface acting in conjunction with a respective conical surface of said double conical ring,
   (c) and axial tensioning bolts distributed around a perimeter of the assembly and inserted in axial holes located in said conical rings, said axial tensioning bolts placing said conical rings under axial tension to force them to slide along said conical surfaces,
   a first one of said conical rings being adapted to tension a first portion of the double conical stressing assembly on a hub with said first ring being located about the hub, and the other conical ring being adapted to tension a second portion of the double conical stressing assembly on a portion of a shaft with said other ring being located about said shaft portion.

7. A conical stressing device for connecting a hub to a shaft, said device including a double conical stressing assembly adapted to be mounted on the outer periphery of the hub, so that the hub may be radially compressed to attach it rigidly to the shaft by frictional forces, said double conical stressing assembly comprising:
   (a) a double conical ring having two coaxial peripheral surfaces axially spaced apart, tapering in opposite directions and having the greatest wall thickness of the double conical ring in the central region of its axial length,
   (b) two conical rings, each having a conical peripheral surface acting in conjunction with a respective conical surface of said double conical ring,
   (c) and axial tensioning bolts distributed around a perimeter of the assembly and inserted in axial holes located in said conical rings, said axial tensioning bolts placing said conical rings under axial tension to force them to slide along said conical surfaces,
   one of said conical rings being adapted to tension a first portion of the double conical stressing assembly around a hub, and the other conical ring being adapted to tension a second portion of the double conical stressing assembly on a portion of a shaft,
   the peripheral surface of the double conical ring being an outer surface, the conical rings being dimensioned to have the strength necessary for exerting the ring tensioning to develop adequate frictional connection, said conical rings being mounted on the outside of the double conical ring, the inner peripheral surface of the double conical ring being stepped cylindrically so that its larger internal diameter is adapted to seat on the hub and its smaller internal diameter is adapted to seat on the shaft portion.

8. A conical stressing device for connecting a hub to a shaft, said device including a double conical stressing assembly adapted to be mounted on the outer periphery of the hub, so that the hub may be radially compressed to attach it rigidly to the shaft by frictional forces, said double conical stressing assembly comprising:
- (a) a double conical ring having two coaxial peripheral surfaces axially spaced apart, tapering in opposite directions and having the greatest wall thickness of the double conical ring in the central region of its axial length,
- (b) two conical rings, each having a conical peripheral surface acting in conjunction with a respective conical surface of said double conical ring,
- (c) and axial tensioning bolts distributed around a perimeter of the assembly and inserted in axial holes located in said conical rings, said axial tensioning bolts placing said conical rings under axial tension to force them to slide along said conical surfaces, one of said conical rings being adapted to tension a first portion of the double conical stressing assembly around a hub, and the other conical ring being adapted to tension a second portion of the double conical stressing assembly on a portion of a shaft, the peripheral surface of the double conical ring being the inner surface, the double conical ring being dimensioned to have the strength necessary for exerting the ring tensioning to develop adequate frictional connection, the conical rings being mounted on the inside of the double conical ring, the cylindrical inner peripheral surfaces which are situated opposite to their conical surfaces having different internal diameters so that said one conical ring is adapted to being mounted on the hub and said other conical ring is adapted to be mounted on the shaft portion.

* * * * *